United States Patent
Bae et al.

(10) Patent No.: US 8,242,641 B2
(45) Date of Patent: Aug. 14, 2012

(54) VIBRATION MOTOR

(75) Inventors: Yu-Dong Bae, Suwon-si (KR); Eun-Hwa Lee, Suwon-si (KR); In-Kuk Yun, Suwon-si (KR); In Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 84 days.

(21) Appl. No.: 12/603,885

(22) Filed: Oct. 22, 2009

(65) Prior Publication Data

US 2010/0096936 A1 Apr. 22, 2010

(30) Foreign Application Priority Data

Oct. 22, 2008 (KR) .................. 10-2008-0103494

(51) Int. Cl.
*H02K 33/00* (2006.01)
(52) U.S. Cl. ............................. 310/15; 310/14
(58) Field of Classification Search .............. 310/14, 310/15, 23, 12.15, 12.16
See application file for complete search history.

(56) References Cited

U.S. PATENT DOCUMENTS

| 5,894,263 | A | 4/1999 | Shimakawa et al. |
| 6,404,085 | B2 * | 6/2002 | Hamaguchi et al. ......... 310/81 |
| 6,850,138 | B1 * | 2/2005 | Sakai ........................ 335/222 |
| 7,038,335 | B2 * | 5/2006 | Choi et al. ................. 310/12.24 |
| 2005/0047621 | A1 | 3/2005 | Cranfill et al. |
| 2006/0226714 | A1 * | 10/2006 | Miura ........................ 310/12 |

FOREIGN PATENT DOCUMENTS

| JP | 10-117472 | 5/1998 |
| JP | 2003-009495 | 1/2003 |
| JP | 2003-033724 | 2/2003 |

* cited by examiner

*Primary Examiner* — Nguyen N Hanh
(74) *Attorney, Agent, or Firm* — The Farrell Law Firm, P.C.

(57) ABSTRACT

A vibration motor includes a first resilient member and a second resilient member providing resilient forces in opposite directions; a first vibrator and a second vibrator coupled to the first resilient member and the second resilient member respectively; a magnetic body coupled to the first vibrator to create a magnetic field; and a coil applying a current of a predetermined frequency band in the region where the magnetic field is created.

16 Claims, 7 Drawing Sheets

VIBRATION MOTOR

PRIORITY

This application claims priority under 35 U.S.C. §119(a) to an application filed in the Korean Industrial Property Office on Oct. 22, 2008 and assigned Serial No. 10-2008-0103494, the contents of which are incorporated herein by reference.

BACKGROUND OF THE INVENTION

1. Field of the Invention

The present invention relates to an electric motor, and more particularly to a small-sized linear motor employed in a portable electronic device.

2. Description of the Related Art

Electric motors convert input electrical energy to mechanical energy, based on Fleming's law that a force applied to move a conductor through a magnetic field will cause a current to flow through the conductor.

Electric motors are applied to various fields according to their size and purpose, and are widely used as vibration motors in portable terminals. Vibration motors of portable terminals have been used to inform the user of reception of a call or reception of a text message.

In recent years, due to development of technologies, portable terminals including a touch screen as an input interface are being distributed, and various user interfaces for portable terminals including a touch screen are being developed. Specifically, various methods for informing the user of the operation of a touch screen are being developed. As an example, vibration motors of portable terminals are activated in correspondence to a user's touching of a touch screen, in order to provide feedback to the user of operation of the touch screen.

In general, coin type motors or bar type motors are employed in portable terminals for traditional purposes of vibration motors such as informing the user of call or text message reception of a. However, coin type and bar type motors do not provide quick response characteristics, and output undesirable residual vibrations. Therefore, when coin type or bar type motors are used to inform the user of the operation of a touch screen, the response speed to a touch of the touch screen by the user is not quick, thus making it difficult to quickly cope with the operation of the user.

To address the above-described problem, linear motors that have a response time that is shorter than that of coin type or bar type motors, that consume less power and that have a high reliability are being employed. Linear motors are driven based on forced harmonic vibration. However, linear motors apply only one resonance frequency when vibrating, and their vibration forces rapidly decrease for frequencies other than the resonance frequency.

Moreover, due to the above-described problem, linear motors are limited in the number of various signals that can be output to inform the user of a touch screen operation. In particular, since users prefer to receive feedback at various frequencies according to individual taste and particular operation, the present invention has been developed to satisfy such user demand.

SUMMARY OF THE INVENTION

Accordingly, the present invention has been made to solve the above-mentioned problems occurring in conventional devices, and the present invention provides a vibration motor that can be driven at least two resonance frequencies using a single actuator.

In accordance with an aspect of the present invention, there is provided a vibration motor including a first resilient member and a second resilient member providing resilient forces in opposite directions; a first vibrator and a second vibrator coupled to the first resilient member and the second resilient member respectively; a magnetic body coupled to the first vibrator to create a magnetic field; and a coil applying a current of a predetermined frequency band in a region where the magnetic field is created.

Preferably, the magnetic body uniformly distributes a magnetic flux toward the center thereof. In addition, the coil preferably has an annular shape and the second vibrator is installed in a space provided at a central portion of the annular shape.

It is also preferred that the magnetic body has a cylindrical shape and provides an annular space into which the annular coil is inserted. In addition, it is preferred that the coil is coupled to the second vibrator, more preferably with the coil attached to one surface of the second vibrator.

It is also preferred that the second vibrator includes an annular guide having an outer diameter corresponding to an inner diameter of the annular coil. It is further preferred that a magnetic fluid is provided on a side opposite to the resilient force of the first resilient member and/or the second resilient member. Still further, it is preferred that the first resilient member and the second resilient member apply different magnitudes of resilient forces.

In addition, it is preferred that when the vibration motor has a predetermined frequency band of 100 to 250 Hz, the first vibrator vibrates in a frequency band of 100 to 250 Hz, and that when the vibration motor has a predetermined frequency band of 200 to 450 Hz, the first vibrator vibrates in a frequency band of 200 to 450 Hz.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, specific items such as particular components are described only to provide overall understanding of the present invention and it is apparent to those skilled in the art that changes or modifications can be made without departing from the scope of the present invention.

Figure 1:
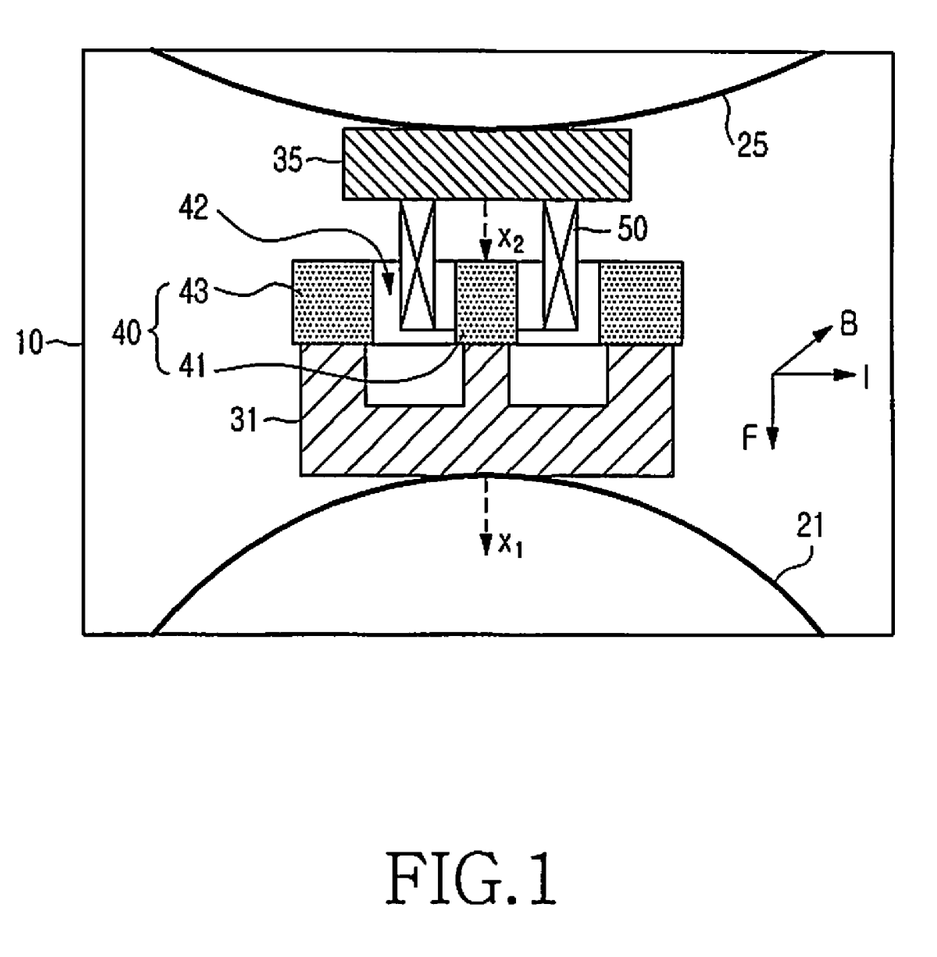
FIG. 1 is a sectional view schematically illustrating a vibration motor according to the first embodiment of the present invention.

FIG. 1 is a sectional view schematically illustrating a vibration motor according to the first embodiment of the present invention. Referring to FIG. 1, the vibration motor according to the first embodiment of the present invention includes a housing 10, first and second resilient members 21 and 25, first and second vibrators 31 and 35, a magnetic body 40, and a coil 50. The housing 10 provides a space in which the elements are accommodated.

The first and second resilient members 21 and 25 may be leaf springs, with ends thereof fixed to the housing 10 such that resilient forces are applied in opposite directions. For example, an end of the first resilient member 21 is fixed to a bottom of the housing 10 and an end of the second resilient member 25 is fixed to a top of the housing 10. Accordingly, the first resilient member 21 applies a resilient force toward the top of the housing 10 to which the second resilient member 25 is fixed and the second resilient member 25 applies a resilient force toward the bottom of the housing 10 to which the first resilient member 21 is fixed.

The first and second resilient members 21 and 25 are preferably bonded or welded to the housing 10.

The first and second vibrator 31 and 35 are coupled to convex portions of the first and second resilient members 21 and 25 respectively. The first and second vibrators 31 and 35 and the resilient members 21 and 25 may be coupled to each other through bonding members or mechanically through coupling members, such as rivets.

The magnetic body 40 is attached to a top end of the first vibrator 31 to create a magnetic field in a peripheral region where the first vibrator 31 is located. Preferably, the magnetic body 40 uniformly distributes magnetic fluxes toward a center thereof. For example, the magnetic body 40 may include a first cylindrical magnetic member 41 and a second annular magnetic member 43 accommodating the first magnetic member 41 and spaced apart from the first magnetic member 41 by a predetermined distance. The top of the first magnetic member 41 is magnetized to an N-pole and the top of the second magnetic member 43 is magnetized to an S-pole.

The coil 50 is provided on one surface (e.g. the bottom surface) of the second vibrator 35 and is located within the magnetic field created by the magnetic body 40. Preferably, the coil 50 has an annular shape and is inserted into an annular space between the first magnetic member 41 and the second magnetic member 43.

Moreover, the first magnetic body 41 and the second magnetic body 43 are preferably spaced apart from each other by a distance long enough to insert the annular coil 50 between them.

Meanwhile, if a current is applied to the coil 50, which is positioned in a magnetic field created by the magnetic body 40, and the magnetic field in direction "B" shown in FIG. 1, current will flow through the coil 50 in direction "I". Then, a force is generated in direction "F" and the first vibrator 31 moves in the direction "F" corresponding to the generated force. Moreover, when an alternating current is applied to the coil 50, the first vibrator 31 vibrates upward and downward due to the force based on the above-described mechanism and the resilient force provided by the first resilient member 21. In addition, the second vibrator 35 vibrates upward and downward due to the force based on the above-described mechanism and the resilient force provided by the second resilient member 25.

Then, the first vibrator 31 and the second vibrator 35 have natural resonance frequencies. The responses of the first and second vibrators 31 and 35 are maximal only at their natural resonance frequency and are low at the remaining frequencies.

Therefore, the vibration motor according to the first embodiment of the present invention receives responses only at the two resonance frequencies.

The vibration of first vibrator 31 will correspond to Equation (1) below and the vibration of second vibrator 35 will correspond to Equation (2) below. The natural resonance frequencies of the first vibrator 31 and the second vibrator 35 can be variously set based on Equations (3) and (4) below.

$$F_0 \sin w_1 t = M_1 x_1'' + c_1 x_1' + k_1 x_1 \tag{1}$$

$$F_0 \sin w_2 t = M_2 x_2'' + c_2 x_2' + k_2 x_2 \tag{2}$$

$$w_1 = \sqrt{\frac{k_1}{M_1}} \tag{3}$$

$$w_2 = \sqrt{\frac{k_2}{M_2}} \tag{4}$$

In Equations (1) to (4), $M_1$ and $M_2$ are the respective masses of the first and second vibrators 31 and 35, $c_1$ and $c_2$ are damping coefficients, $k_1$ and $k_2$ are resiliency coefficients of the first and second resilient members 21 and 25 respectively, $x_1$ and $x_2$ indicate the displacements shown in FIG. 1, $F_0$ is an exciting force due to a current applied to the coil 50, and $w_1$ and $w_2$ indicate the natural resonance frequency of the first and second vibrators 31 and 35, respectively.

Preferably, the natural resonance frequency of the first vibrator 31 is 100 to 250 Hz, and the natural resonance frequency of the second vibrator 35 is 200 to 450 Hz.

Figure 2:
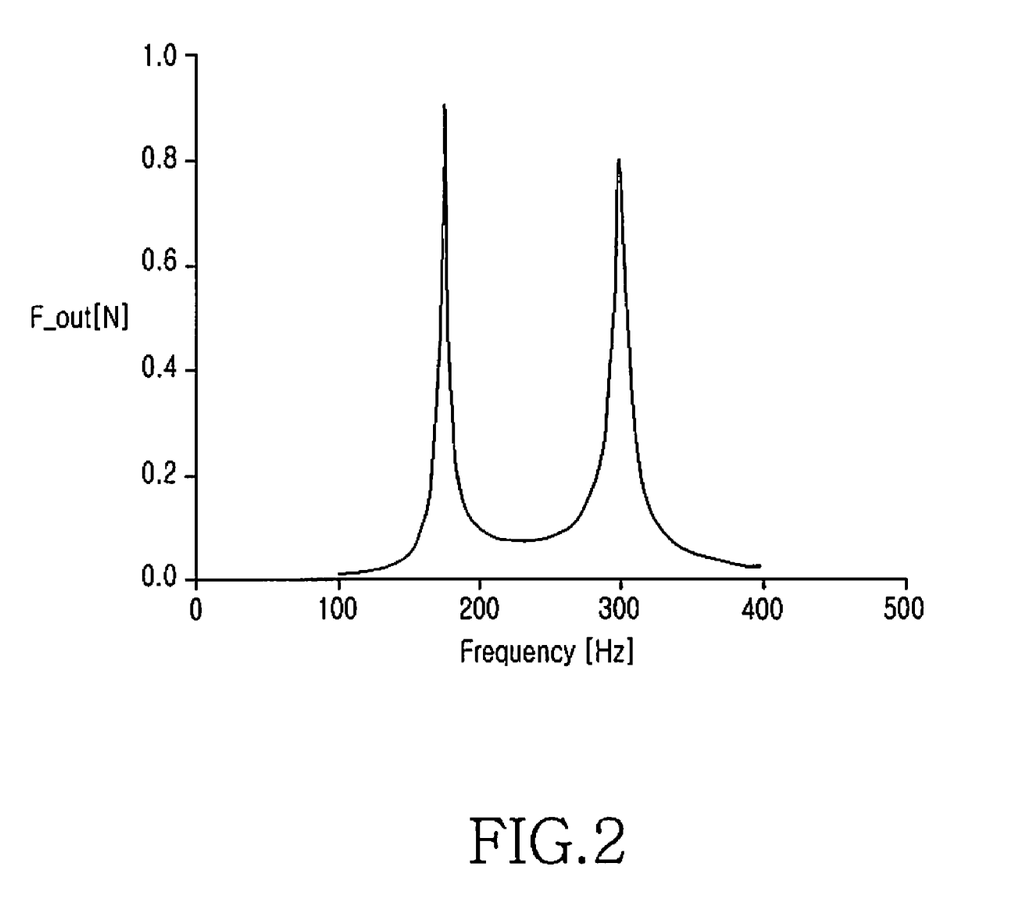
FIG. 2 is a graph illustrating natural resonance frequencies of a first vibrator and a second vibrator according to the first embodiment of the present invention.
Figure 3A:
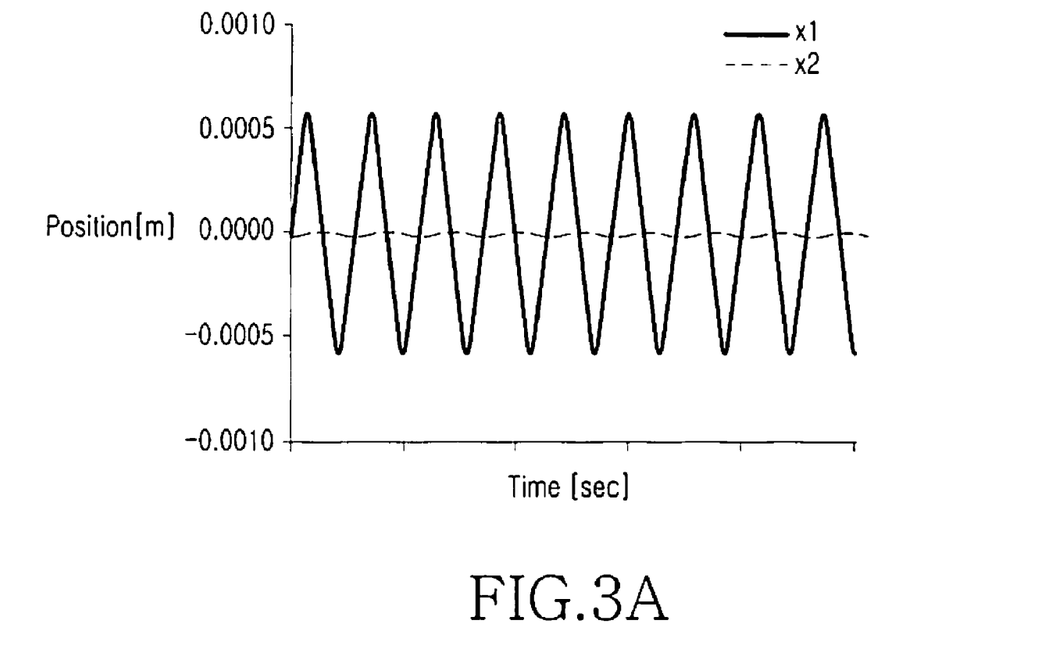
FIG. 3A is a graph illustrating displacements of the first vibrator and the second vibrator in a frequency band of 175 Hz, according to the first embodiment of the present invention.
Figure 3B:
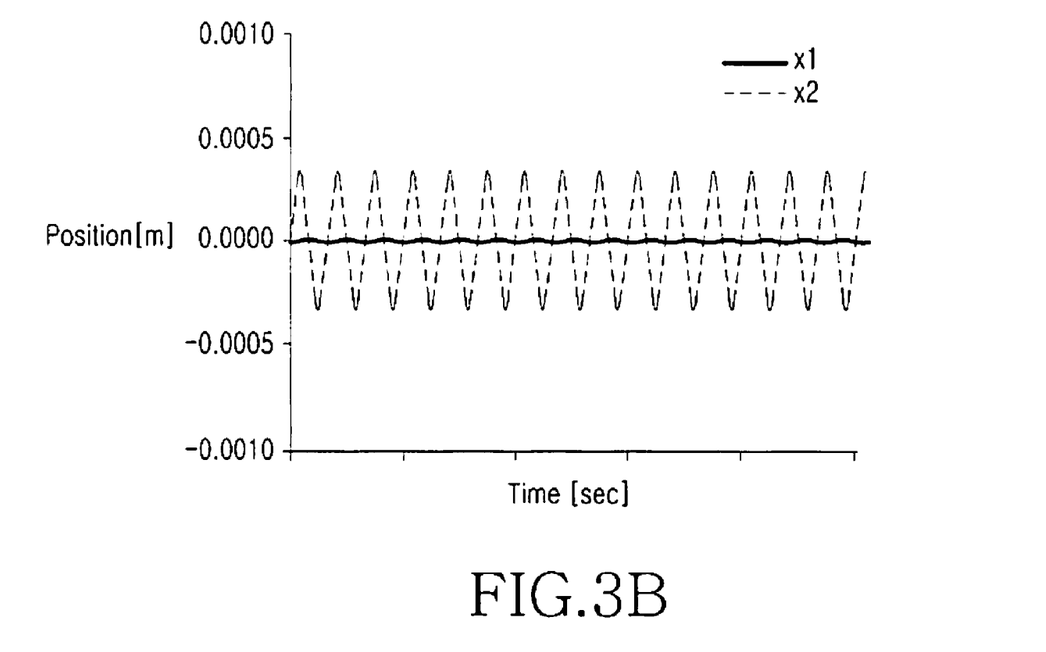
FIG. 3B is a graph illustrating displacements of the first vibrator and the second vibrator in a frequency band of 300 Hz, according to the first embodiment of the present invention.

Referring to FIG. 2, the first vibrator 31 is set to a resonance frequency of approximately 175 Hz and the second vibrator 35 is set to a resonance frequency of approximately 300 Hz. Referring to FIG. 3A, it can be seen that the first vibrator 31 vibrates only in a frequency band of 175 Hz. Referring to FIG. 3B, it can be seen that the second vibrator 35 vibrates only in a frequency band of 300 Hz. That is, the response of the first and second vibrators 31 and 35 are maximized only at the resonance frequencies respectively, and the counterpart merely vibrates at a level less than −15 db of the counterpart vibration. As a result, the first vibrator 31 and the second vibrator 35 may vibrate simultaneously using the single coil 50, and the responses of the first and second vibrator 31 and 35 are maximized at their respective natural resonance frequencies.

Figure 4:
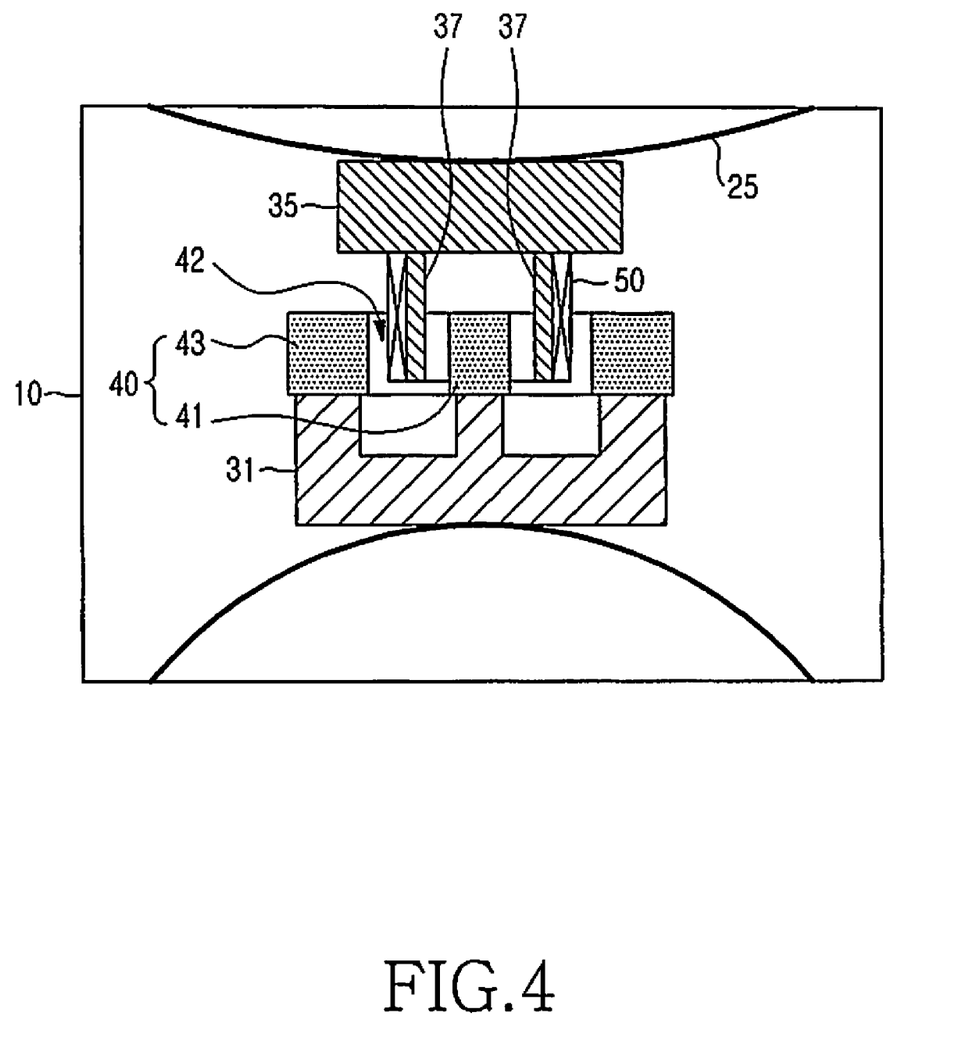
FIG. 4 is a sectional view schematically illustrating a vibration motor according to a second embodiment of the present invention.

FIG. 4 is a sectional view schematically illustrating a vibration motor according to the second embodiment of the present invention. Referring to FIG. 4, the vibration motor according to the second embodiment of the present invention has a structure similar to that of the vibration motor according to the first embodiment of the present invention except that the second vibrator 35 has a guide 37 mounted on one surface of the coil. The guide 37 has an annular shape and an outer diameter of the guide 37 has a size corresponding to an inner diameter of the coil 50.

Although the guide 37 has an annular shape in the embodiment of the present invention, the present invention is not limited thereto. That is, the guide 37 sufficiently realizes its function when fixed to the coil 50. For example, the guide 37 may be a plurality of bars attached to the inner surface of the coil 50.

Figure 5A:
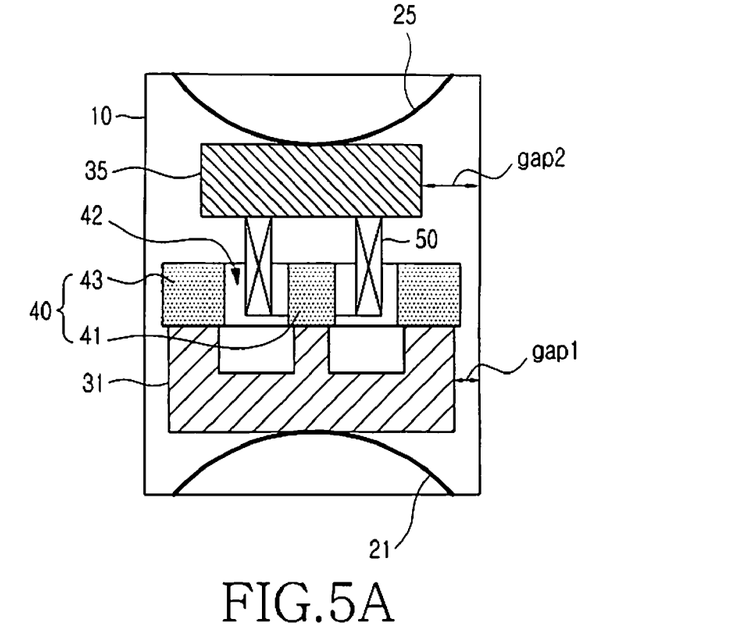
FIG. 5A is a sectional view schematically illustrating a vibrator motor according to a third embodiment of the present invention.
Figure 5B:
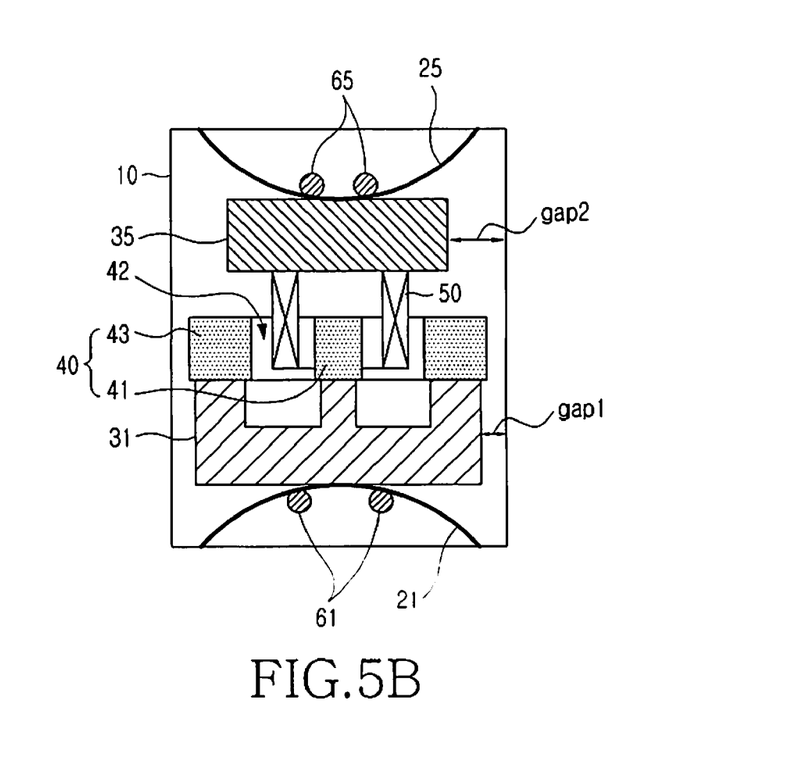
FIG. 5B is a sectional view schematically illustrating a vibrator motor according to a fourth embodiment of the present invention.

Meanwhile, if the damping characteristics are set differently in the vibration motor according to the embodiments of the present invention, it is possible to control the response characteristics at the same resonance frequencies. Therefore, the vibration motor of the present invention provides various haptic feedbacks by adjustment of the damping characteristics of the vibration motor. The third and fourth embodiments of the present invention exemplify vibration motors that create various haptic feedbacks by setting the damping characteristics differently.

Referring to FIGS. 5A and 5B, the vibration motors according to the third and fourth embodiments of the present invention have structures similar to that of the vibration motor according to the first embodiment of the present invention. However, the vibration motor according to the third embodiment of the present invention adjusts the damping characteristics of the first and second vibrators 31 and by differently setting the gaps between the first and second vibrators 31 and 35 and the inner wall of the housing 10.

The first gap, labeled 'gap1' in FIGS. 5A and 5B, between the first vibrator 31 and the inner wall of the housing 10 is smaller than the second gap, labeled 'gap2', between the second vibrator 35 and the inner wall of the housing 10. Air inside the gaps, gap1 and gap2, hampers movement of the first vibrator 31 and the second vibrator 35, and applies damping forces to the first vibrator 31 and the second vibrator 35. Therefore, a relatively strong damping force is applied to the first vibrator 31 to provide the first vibrator 31 with the relatively quick response characteristics.

Meanwhile, the vibration motor according to the fourth embodiment of the present invention includes magnetic fluids 61 and 65, each having different damping coefficients, provided on the first and second resilient members 21 and 25. The magnetic fluids 61 and 65 have different damping coefficients and apply different damping forces to the first vibrator 31 and the second vibrator 35, thus realizing different response characteristics. For example, when the magnetic fluid 61 provided on the first resilient member 21 has a damping coefficient larger than that of the magnetic fluid 65 provided on the second resilient member 25, a relatively strong damping force is applied to the first vibrator 31, thus providing the first vibrator 31 with the relatively quick response characteristics.

Figure 6:
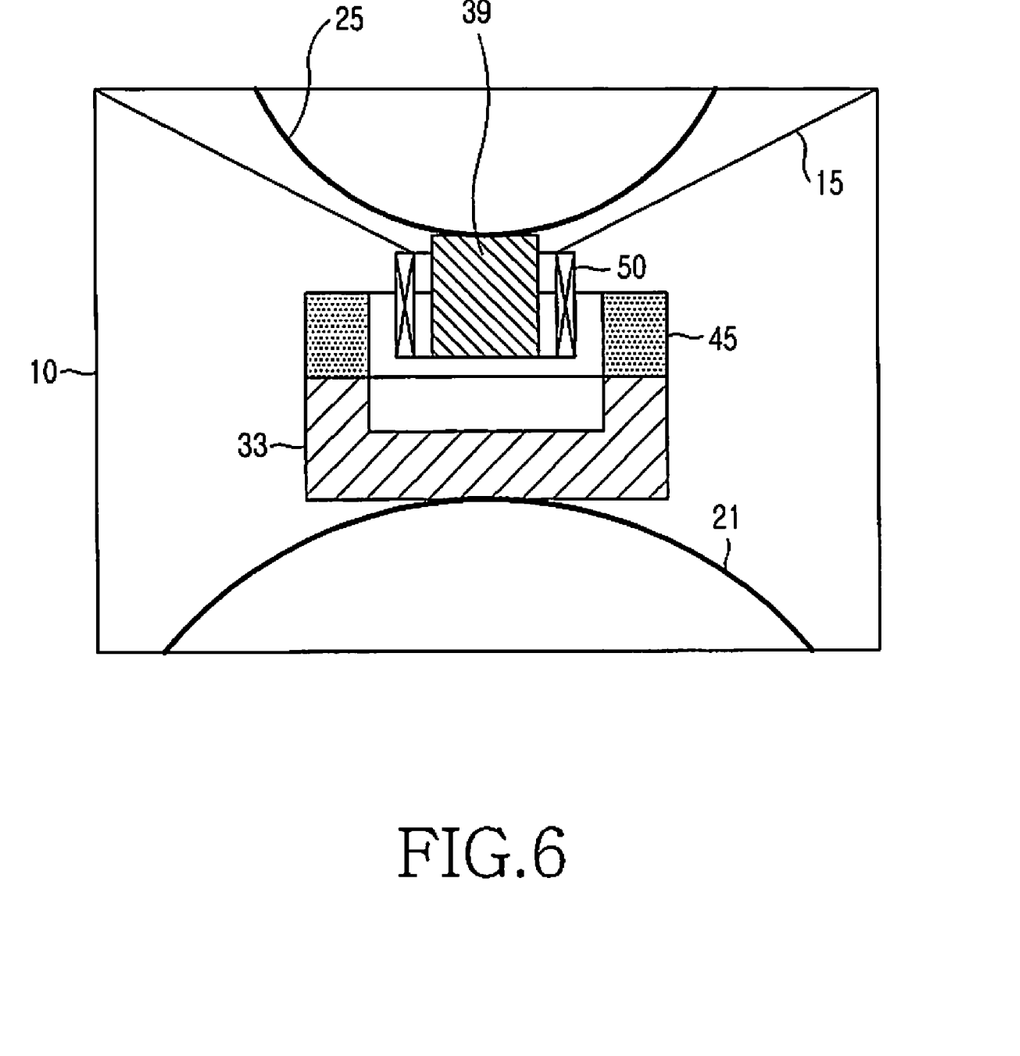
FIG. 6 is a sectional view schematically illustrating a vibrator motor according to a fifth embodiment of the present invention.

Referring to FIG. 6, the vibration motor according to the fifth embodiment of the present invention includes a housing 10, first and second resilient members 21 and 25, first and second vibrators 33 and 39, a magnetic body 45, and a coil 50. The first and second resilient members 21 and 25 are the same as those of the vibration motor according to the first embodiment of the present invention.

The first and second vibrators 33 and 39 are coupled to the convex portions of the first and second resilient members 21 and 25. The first and second vibrators 33 and 39 and the resilient members 21 and 25 are preferably coupled to each other through bonding members or mechanically through coupling members.

The magnetic body 45 is attached to the top end of the first vibrator 33 and creates a magnetic field in a peripheral region where the first vibrator 33 is located. The magnetic body 45 uniformly distributes magnetic fluxes toward a center thereof. The magnetic body 45 preferably has an annular shape, and the top of the first magnetic member 45 is magnetized to an N-pole and the bottom thereof is magnetized to an S-pole.

The coil 50 has an annular shape whose outer diameter is smaller than the inner diameter of the annular magnetic body 45. The coil 50 is fixed to a space formed inside the annular magnetic body 45. The housing 10 includes a coil fixing member 15 for attachment of the coil 50. Although the coil fixing member 15 has a conical shape in the embodiment shown in FIG. 6, the present invention is not limited to such shape.

Moreover, the first vibrator 33 is sized to allow coupling of the annular magnetic body 45 thereto, and preferably has a plate-like shape or a plate-like shape having an annular boss.

Meanwhile, the second vibrator 39 has an outer diameter smaller than the inner diameter of the coil 50, and can be freely moved in a region inside the coil 50. In particular, the second vibrator 39 functions as an iron core, and the coil 50 and the second vibrator 39 function as electro-magnets when a current flows through the coil 50. Unlike the first embodiment of the present invention, the first vibrator 35 and the second vibrator 39 are not driven by a force based on Fleming's law, but are driven by the repulsive and attractive forces of the magnetic field created by the second vibrator 39 functioning as an electro-magnet and the magnetic field created by the magnetic body 45.

Figure 7:
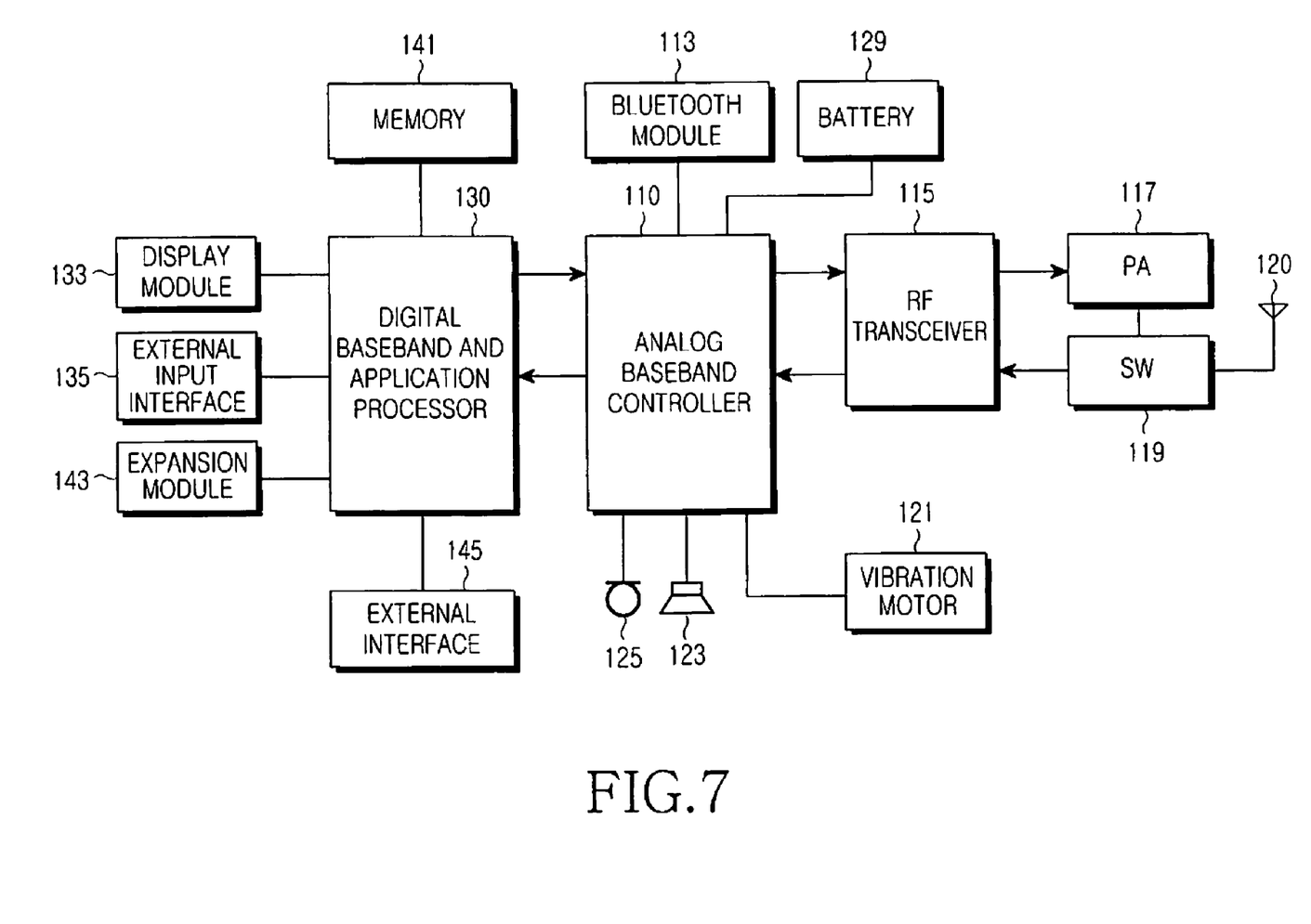
FIG. 7 is a block diagram exemplifying the structure of a mobile communication terminal to which a vibration motor according to the present invention is applied.

FIG. 7 is a block diagram exemplifying the structure of a mobile communication terminal to which a vibration motor according to the present invention is applied. Referring to FIG. 7, the mobile communication terminal includes a display module 133 that preferably uses a liquid crystal display or a Light Emitting Diode (LED) display, and an external input interface 135.

The mobile communication terminal also includes a Digital Baseband and Application Processor (DBAP) 130. The DBAP 130 processes an input, prepares display data, and executes a software program (e.g. an operation system program and a user interface program). That is, the software program executed by the DBAP 130 provides a mode based on the function of the mobile communication terminal through the display module 133. The DBAP 130 uses a signal input from the external input interface 135 and provides logic for the user to select of an operation mode. For example, the external input interface 135 may be a keypad module or a touch screen module through which the user can check the contact position using a change in high frequencies, a change in resistance or voltage, and a change in ultrasonic waves to create position information (e.g. a coordinate) of the contact region.

The software program may be stored in a memory inside the DBAP 130 or may be stored in a memory 141 (e.g. a flash memory) coupled to the DBAP 130. The memory 141 can store user data (e.g. a moving image file, a voice file, and a phone number). The DBAP 130 is also preferably connected to a port for an expansion module (e.g. a smart digital card) and an external interface (e.g. a USB interface). The expansion module 143 can add an additional function to the system (for example, by storing software or data in a game, a dictionary, or other useful feature module), and the external interface 145 enables a program and/or data to be exchanged with another system.

The DBAP 130 is connected to an Analog Baseband Controller (ABC) 110 to exchange data or instructions with the ABC 110. The ABC 110 processes data from a cellular phone signal or data for a cellular phone signal, creates an audio signal for driving of a speaker 123, and encodes an audio input from a microphone 125, to provide a conventional portable phone function. The ABC 110 is preferably coupled to a Bluetooth module 113 driven based on a Bluetooth communication protocol, and transmits data transmitted from the DBAP 130 via the Bluetooth module 113.

A battery 129 is coupled to all the elements in the device 1354 to supply power. The battery 129 is generally rechargeable and includes an input for a charging operation thereof.

The ABC 110 is coupled to an RF transceiver 115 to exchange data received through an antenna 120 bidirectionally. The RF transceiver 115, a power amplifier 117, a switch 119, and the antenna 120 are elements included in a conventional cellular phone as understood by one of skill in the art.

The ABC 110 is also preferably coupled to the vibration motor 121 to control the operation of the vibration motor 121 based on a signal received from the RF transceiver 115 or a signal received from the DBAP 130.

For example, the ABC 110 receives a call request signal or a text message transmission signal through the antenna 120 and the RF transceiver 115 and controls the operation of the vibration motor 121 to inform the user of the reception of the signal. Specifically, the ABC 110 transmits an alternating current of a preset resonance frequency by which the first vibrator 31 can vibrate to the vibration motor 121 in correspondence to reception of a call request signal by the mobile communication terminal or transmits a current of a preset resonance frequency by which the second vibrator 35 can vibrate to the vibration motor 121 in correspondence to reception of a text message transmission signal.

As indicated above, the DBAP 130 executes various software programs (e.g. operational program, user interface programs and game programs), and provides the user with various menus or contents. The user selects and inputs a menu or content provided by the mobile communication terminal. When the user receives one of the menus or contents, the DBAP 130 transmits a signal corresponding to an input to the ABC 110. The ABC 110 preferably controls the operation of the vibration motor 121 in correspondence to a signal received from the DBAP 130. For example, the ABC 110 can transmit a current of a preset resonance frequency by which the first vibrator 31 or the second vibrator 35 can vibrate to the vibration motor 121. Moreover, the ABC can repeatedly transmit a current of a preset resonance frequency by which the first vibrator 31 or the second vibrator 35 can vibrate to the vibration motor 121 by a number of times (e.g. three times), or can transmit a current of a preset resonance frequency by which the first vibrator 31 or the second vibrator 35 can vibrate to the vibration motor 121 for a predetermined period of time (e.g. 500 ms).

In a preferred embodiment of the present invention, although the vibration motor 121 is controlled by the ABC 110, the present invention is not limited thereto but can be variously modified.

In the vibration motor according to the present invention, the user can set the resonance frequency according to his or her tastes. Further, various touch screen feedbacks can be provided by a combination of vibrations due to two frequencies. Furthermore, since two resonance frequencies are generated by one actuator, various functions can be performed without any additional space when the vibration motor is mounted in the body.

While the invention has been shown and described with reference to certain exemplary embodiments thereof, it will be understood by those skilled in the art that various changes in form and detail may be made therein without departing from the spirit and scope of the invention as defined by the appended claims.

What is claimed is:

1. A vibration motor comprising:
   a first resilient member and a second resilient member providing resilient forces in opposite directions;
   a first vibrator and a second vibrator coupled to the first resilient member and the second resilient member, respectively;
   a magnetic body coupled to the first vibrator to create a magnetic field; and
   a coil positioned in a region where the magnetic field is created, wherein the coil applies an alternating current of a predetermined frequency,
   wherein the first vibrator is coupled to a convex portion of the first resilient member.

2. The vibration motor according to claim 1, wherein the magnetic body uniformly distributes a magnetic flux toward a center thereof.

3. The vibration motor according to claim 1, wherein the coil has an annular shape and the second vibrator is installed in a space provided at a central portion of the annular shape.

4. The vibration motor according to claim 3, wherein the magnetic body has a cylindrical shape and provides an annular shaped space into which the annular shaped coil is inserted.

5. The vibration motor according to claim 3, wherein the second vibrator includes an annular guide having an outer diameter corresponding to an inner diameter of the annular shaped coil.

6. The vibration motor according to claim 1, wherein the coil is coupled to the second vibrator.

7. The vibration motor according to claim 6, wherein the coil is attached to only one surface of the second vibrator.

8. The vibration motor according to claim 1, wherein a magnetic fluid is provided on a side opposite to the resilient force of the first resilient member and on a side opposite to the resilient force of the second resilient member.

9. The vibration motor according to claim 1, wherein the first resilient member and the second resilient member apply different magnitudes of resilient forces.

10. The vibration motor according to claim 1, wherein the predetermined frequency band is 100 to 250 Hz and the first vibrator vibrates within a frequency band of 100 to 250 Hz.

11. The vibration motor according to claim 1, wherein the predetermined frequency band is 200 to 450 Hz and the first vibrator vibrates within a frequency band of 200 to 450 Hz.

12. The vibration motor according to claim 1, wherein the second vibrator is coupled to a convex portion of the second resilient member.

13. A vibration motor comprising:
   a first resilient member and a second resilient member providing initial resilient forces in opposite directions;
   a first vibrator and a second vibrator coupled to the first resilient member and the second resilient member, respectively;
   a magnetic body coupled to the first vibrator to create a magnetic field; and
   a coil positioned in a region where the magnetic field is created, wherein the coil applies an alternating current of a predetermined frequency,
   wherein each of the first and second resilient members has a convex shape, with an apex of the first resilient member facing an apex of the second resilient member.

14. The vibration motor according to claim 13, wherein the first vibrator is attached to the apex of the first resilient member, and the second vibrator is attached to the apex of the second resilient member.

15. A vibration motor comprising:
- a first resilient member and a second resilient member providing initial resilient forces in opposite directions;
- a first vibrator and a second vibrator coupled to the first resilient member and the second resilient member, respectively;
- a magnetic body coupled to the first vibrator to create a magnetic field; and
- a coil positioned in a region where the magnetic field is created, wherein the coil applies an alternating current of a predetermined frequency, wherein the first vibrator includes a central portion and an annular portion protruding toward the second vibrator, with the annular portion surrounding the central portion.

16. The vibration motor according to claim 15, wherein the magnetic body includes first and second magnetic members, with the first magnetic member attached to the central portion of the first vibrator and the second magnetic member attached to the annular portion of the first vibrator.

* * * * *